United States Patent [19]

Dickhut et al.

[11] 4,439,130
[45] Mar. 27, 1984

[54] PLASTIC TILE CORRUGATOR

[75] Inventors: Heinrich Dickhut, Chebanse; Alfred Lilienthal, Bourbonnais, both of Ill.

[73] Assignee: Cullom Machine Tool & Die, Inc., Cullom, Ill.

[21] Appl. No.: 324,371

[22] Filed: Nov. 23, 1981

[51] Int. Cl.³ .................................... B29C 17/07
[52] U.S. Cl. ................................ 425/388; 264/286; 425/188; 425/326.1; 425/392; 425/396
[58] Field of Search ............... 264/506, 507, 508, 286; 425/188, 326.1, 396, 303, 336, 369, 388, 522, 526, 392, 327

[56] References Cited

U.S. PATENT DOCUMENTS

| | | | |
|---|---|---|---|
| 3,425,092 | 2/1969 | Taga | 425/326.1 |
| 3,538,209 | 11/1970 | Hegler | 264/90 |
| 3,677,676 | 7/1972 | Hegler | 425/109 |
| 3,751,541 | 8/1973 | Hegler | 264/90 |
| 3,776,679 | 12/1973 | Hegler | 425/325 |
| 3,864,446 | 2/1975 | Maroschak | 264/286 |
| 3,891,733 | 6/1975 | Maroschak | 264/508 |
| 3,981,663 | 9/1976 | Lupke | 425/326 B |
| 4,136,143 | 1/1979 | Lupke et al. | 264/508 |
| 4,165,214 | 8/1979 | Lupke et al. | 425/532 |
| 4,184,831 | 1/1980 | Hegler et al. | 425/290 |
| 4,199,314 | 4/1980 | Lupke et al. | 425/532 |
| 4,212,618 | 7/1980 | Hegler et al. | 425/326.1 |
| 4,226,580 | 10/1980 | Lupke et al. | 425/504 |
| 4,231,834 | 11/1980 | Gonzalez | 425/442 |
| 4,319,872 | 3/1982 | Lupke | 425/326.1 |
| 4,365,948 | 12/1982 | Chaplain | 264/508 |

FOREIGN PATENT DOCUMENTS

| | | | |
|---|---|---|---|
| 609745 | of 1960 | Canada | 264/286 |

*Primary Examiner*—James B. Lowe
*Attorney, Agent, or Firm*—Wood, Dalton, Phillips, Mason & Rowe

[57] ABSTRACT

A corrugator for receiving plastic from an extruder and continuously molding corrugated plastic tile therefrom. The corrugator has a plurality of mold assemblies which are continuously driven to roll about an endless trackway on the corrugator frame, a portion of which defines a molding section. Each mold assembly includes a pair of mold blocks mounted to pivotally open and close. As the mold assemblies enter the molding section, the mold blocks thereof pivotally close and come into abutting relationship with the closed mold blocks of preceeding mold assemblies to cooperatively form a corrugated molding tunnel. Extruded plastic is received by the molding tunnel which moves with and molds the corrugated tile. At the end of the molding section the mold blocks pivot away from and release the tile. To augment the formation the tile the mold blocks are cooled. Additionally a vacuum is induced between the extruded plastic and the wall of the molding tunnel to assure the mating thereof.

26 Claims, 9 Drawing Figures

PLASTIC TILE CORRUGATOR

BACKGROUND OF THE INVENTION

1. Technical Field

This invention relates to machines which transform extruded thermoplastic into a corrugated plastic tile and more particularly to machines which can be continuously form corrugated plastic tiles.

2. Description of the Prior Art

Due to the utility of corrugated plastic tiles particularly as buried drainage conduits, a need has arisen for devices which can continuously mold lengths of corrugated plastic tiles.

One such type of device is found in U.S. Pat. No. 3,981,663 issued Sept. 21, 1976 to Lupke. Acting in conjunction with a thermoplastic extruder which continuously dispenses a cylindrical tube of heated, pliable plastic, the corrugator has upper and lower mold assemblies each of which consists of endless chains of mold blocks. Synchronously driving the upper and lower mold assemblies causes the individual mold blocks thereof, with the aid of aligning pins, to mate and run together for a portion of the corrugator to form a tunnel defining a tubular mold which receives, moves with and molds the dispensed thermoplastic. At the end of the molding run the mold blocks are drawn substantially radially away from the molded corrugated tile so as not to damage the corrugations formed thereby.

One of the drawbacks of corrugators heretofore used and particularly of the type described above is that they tend to be quite large and therefore require large areas of dedicated space. One of the primary factors contributing to the size of the machine is the requirement that the mold blocks be drawn substantially radially away from the tile at the end of the molding operation so that the corrugated surfaces of the mold blocks do not engage and thereby damage or distort the corrugations.

Another drawback of note is the method by which the mold blocks of the upper and lower mold assemblies are matingly brought together to form the tunnel in which the corrugated tile is molded. Synchronous drives for both the upper and lower mold assemblies are required along with aligning pins on individual mold blocks to assure that the mold blocks properly mate to form the molding tunnel. Occasional slack, induced upon the chains carrying the mold blocks by wear, may result in the failure of the mold blocks to properly come together thereby creating random seams or the like along the corrugated tile or, if the amount of slack is great enough, shearing off the aligning pins on the mold blocks necessitating stopping of the corrugator for replacement thereof.

Yet a further drawback of corrugators heretofore used is that the driving motors, due to the friction between the mold blocks, their interconnecting chains and the frame, must be of substantial horsepower to drive the mold assemblies.

It is an object of the present invention to overcome the drawbacks of corrugators heretofore used particularly those drawbacks set forth above.

SUMMARY OF THE INVENTION

Toward this end a tile corrugator is set forth having a plurality of independent, rolling, mold assemblies each of which is composed of pivotally opening and closing mold blocks. When closed the mold blocks cooperate to define a segment of a corrugated tunnel which receives thermoplastic from the extruder for the formation of the corrugated tile. The mold assemblies are received, guided by and roll along an endless trackway about the frame of the corrugator, a portion of which defines the molding section of the corrugator. A drive means engages the mold assemblies at a location on the frame to circulate them about the trackway, the mold assemblies particularly at the molding section of the corrugator pushing one another in abutting relationship. A pivoting means causes the mold blocks to pivotally close as they sequentially enter the molding section. Thereafter, the mold blocks, in cooperation with the mold blocks of adjoining mold assemblies, form a corrugated tunnel which receives the extruded thermoplastic and moves therewith to form the corrugated plastic tile. As the mold assemblies leave the molding section the pivoting means opens the mold blocks away from the tile yielding a corrugated plastic tile. The mold assemblies thereafter return for re-entry into the molding section of the corrugator. Further augmenting the formation of corrugated tiles, the corrugator has a cooling means to cool the mold assemblies and thereby the thermoplastic to enable operation of the corrugator at speeds heretofore unknown. Additionally, vacuum means communicating with the mold tunnel assures that the dispensed thermoplastic fills the mold blocks for proper formation of the corrugated tile.

Accordingly it is an object of the present invention to provide a thermoplastic tile corrugator which is smaller than those heretofore used. The novel pivotally opening and closing mold blocks radially disengage the molded tile without requiring long runs to gradually draw the mold blocks from the tile.

It is a further object of the present invention to provide a tile corrugator which is simpler in operation than those heretofore used. No synchronous drives nor aligning pins are required to assure or maintain proper alignment of the mold blocks for correct molding of the corrugated tile.

It is yet another object of the present invention to provide a tile corrugator which uses a relatively small driving motor. The structure reduces friction between the rolling mold assemblies and the frame avoiding large horsepower requirements to circulate the mold assemblies about the frame.

It is still a further object to provide a novel method for manufacturing corrugated plastic tile including cooling of the mold assemblies and inducing a vacuum between the plastic and the mold blocks to assure proper molding thereof.

Further objects and advantages of the present invention will become apparent upon a reading of the specification, drawings and attached claims.

DESCRIPTION

Figure 1:
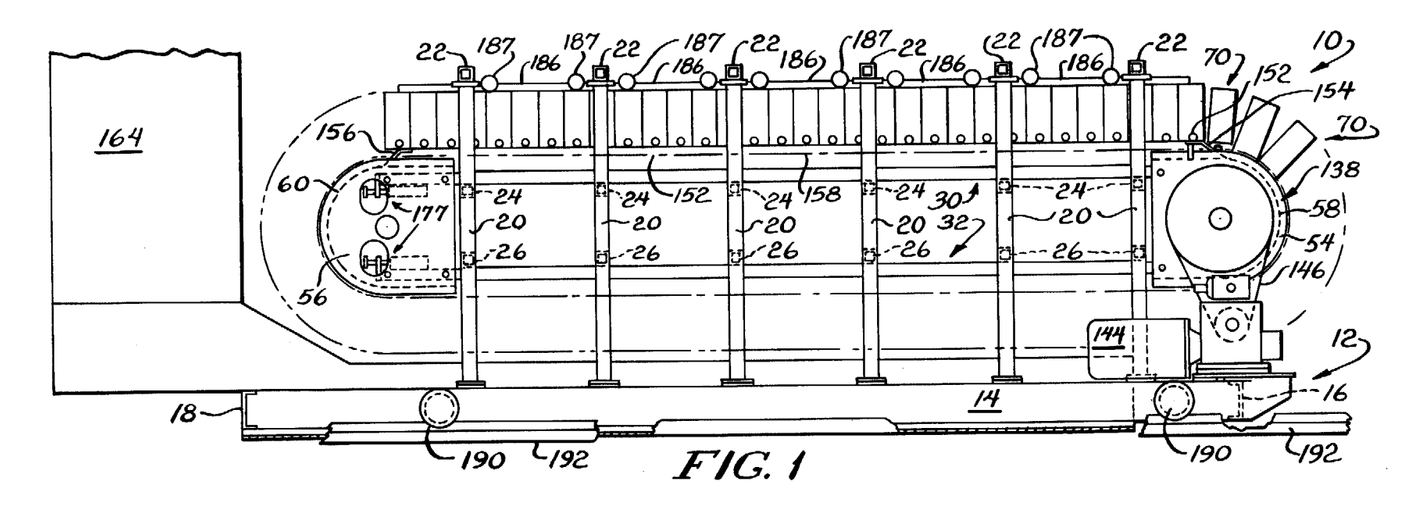
FIG. 1 is a side view of an embodiment of the tile corrugator of this invention with some parts removed for clarity.
Figure 2:
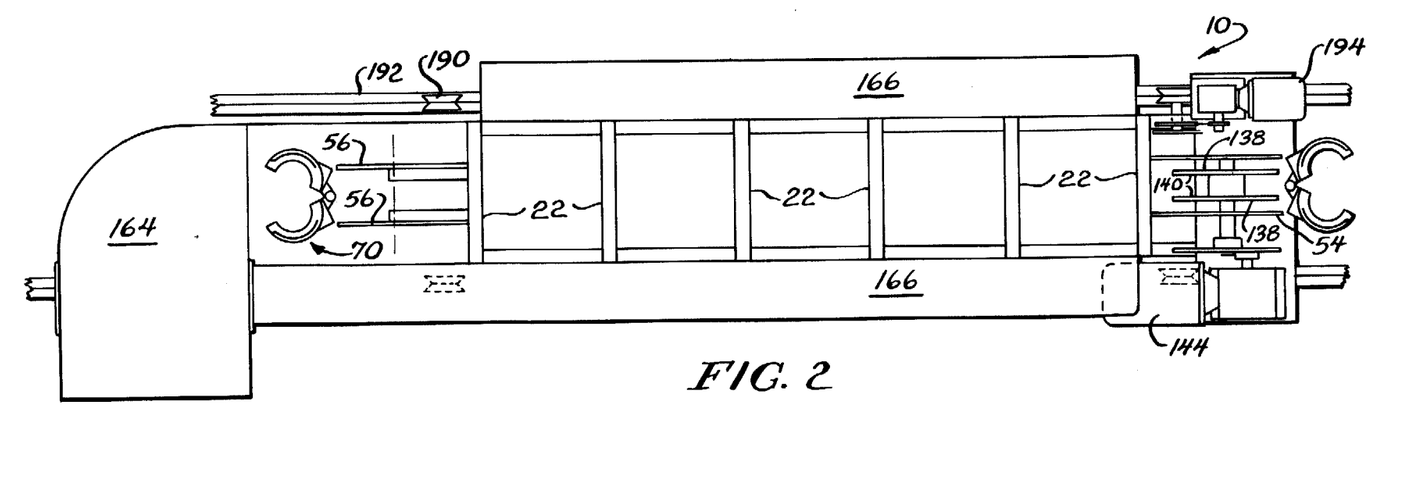
FIG. 2 is a top view of an embodiment of the tile corrugator of the present invention with parts removed for clarity.
Figure 3:
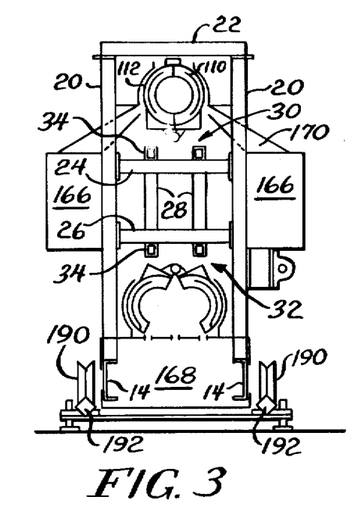
FIG. 3 is a front view of an embodiment of the tile corrugator of the present invention with parts removed for clarity.

Turning to FIGS. 1-3 a tile corrugator 10 of the present invention is shown. The corrugator 10 has a base 12 defined by a pair of side beams 14 having secured thereto a front beam 16 and a rear beam 18. Upstanding from the side beams 14 are a plurality of complementary pairs of braces 20. The complementary braces 20 are in turn mutually supported by a crossmember 22 and a pair of spaced upper and lower ties 24 and 26. For purposes which will hereinafter become evident the upper and lower ties 24 and 26, are parallel and are arranged to be co-planar with their counterparts on the other braces 20. A pair of vertical supports 28 span each pair of upper and lower ties 24 and 26 to provide additional support thereto, and to the remainder of the frame. Accordingly the aforementioned structure provides a sturdy frame for the remainder of the tile corrugator 10 hereinafter set forth.

Figure 4:
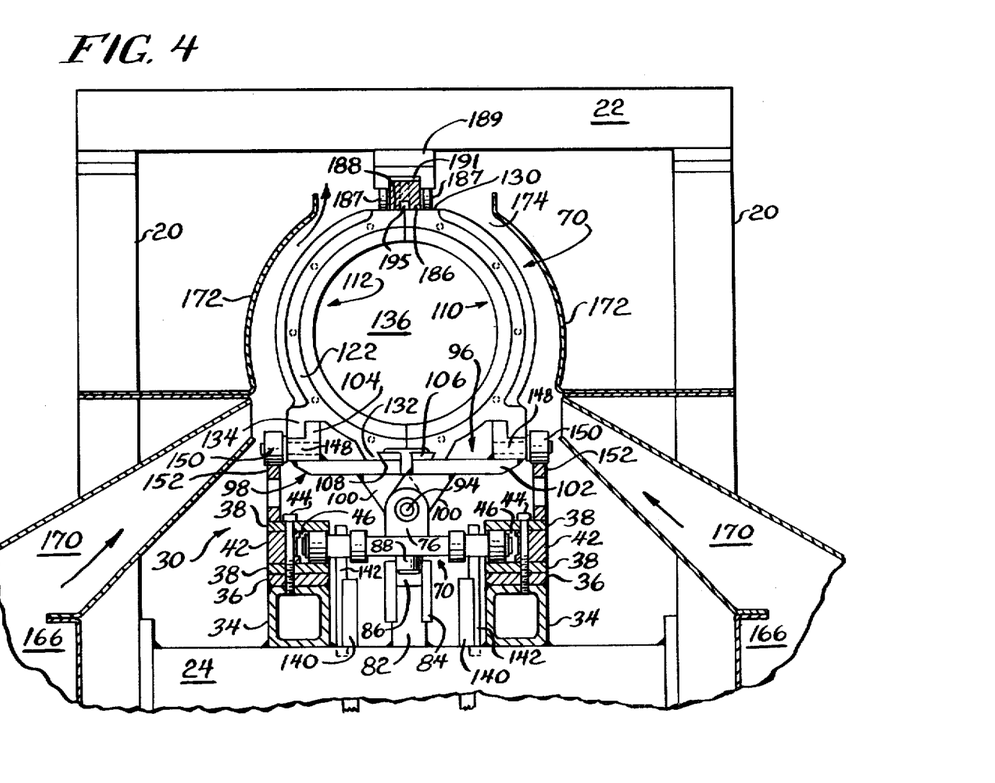
FIG. 4 is an enlarged partial section view of an embodiment of the tile corrugator of the present invention illustrating a mold assembly thereof.

Extending from the front of the corrugator 10 to the rear thereof (right to left as illustrated in FIG. 1) are forward and return track assemblies 30 and 32. The forward track assembly 30 is secured upon the upper ties 24 and provides a rolling trackway the purposes of which will hereinafter become evident. Accordingly, the upper track assembly 30, as best shown in FIG. 4, has a pair of parallel track supports 34 which are secured to the upper ties 24. The track supports 34, which provide additional support to the frame, have secured thereon forward runners 36. Positioned upon the forward runners 36 are a pair of forward rails 38 maintained in a spaced relationship by a spacer 42. The forward rails 38 and spacer 42 are secured to the forward runners 36 and track supports 34 by, for example, a plurality of bolts 44 which pass therethrough. The opposing longitudinal cavities between the forward rails 38 defines forward trackways 46.

Figure 5:
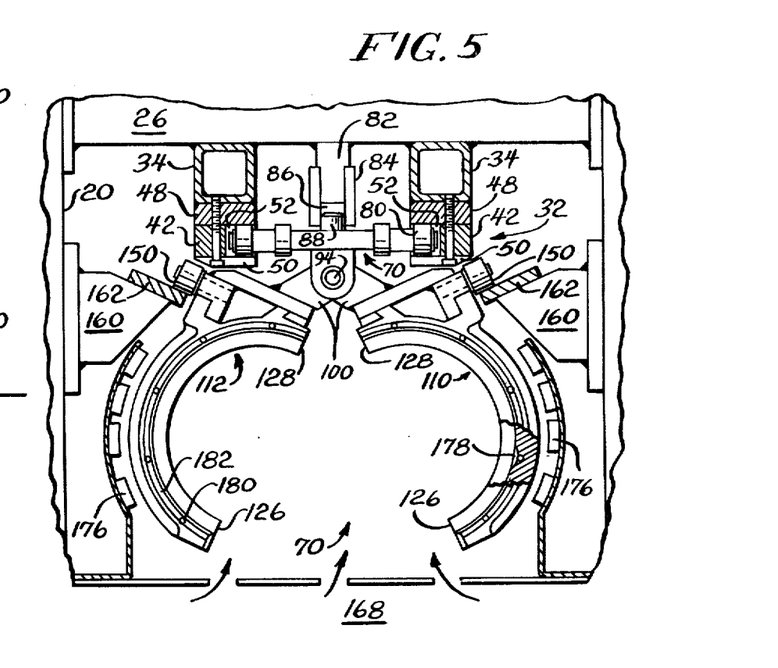
FIG. 5 is an enlarged partial section view of an embodiment of the tile corrugator of the present invention illustrating the mold assembly in the open position.

Turning to FIG. 5 the return track assembly 32 is shown in detail. In a manner similar to the forward track assembly 30 the return track assembly 32 consists of a pair of spaced, parallel track supports 34 which are secured to and suspend from the lower ties 26. Attached to the track supports 34 are return runners 48 which have secured thereto, by bolts 44, return rails 50 spaced apart from return runners 48 by spacers 42. In a manner similar to the forward track assembly 30, the cavities between the return runners 48 and return rails 50 define return trackways 52.

To provide transition between the forward and return trackways 46 and 52, pairs of front and rear members 54 and 56 are secured to the upper and lower track supports 34. The front members 54, shown to the right in FIG. 1, have semicircular front trackways 58 which are similar to and whose ends mate with the forward and return trackways 46 and 52 thereby providing a continuous transition therebetween. The rear members 56 likewise have semicircular rear trackways 60 which are similar to and whose ends mate with the forward and return trackways 46 and 52 to provide a continuous transition therebetween. Accordingly, the forward and return trackways 46 and 52 along with the front and rear trackways 58 and 60 described above provide an endless track about the corrugator 10, preferably with relatively long horizontal runs one above the other.

Figure 6:
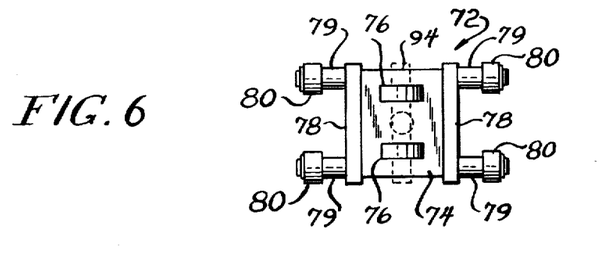
FIG. 6 is a top view of the mold assembly carriage of the present invention.

Supported and guided by the above described trackways for rolling action therealong are a plurality of mold assemblies 70. In that all mold assemblies 70 are alike, only one will be described in detail. As best seen in FIGS. 4-6 each mold assembly 70 has a supporting carriage 72 with a body 74 supporting a pair of eyelets 76 shown as upstanding in FIG. 4. A pair of opposing sides 78 of the body 74 support coaxial pairs of outwardly extending axles 79 on the ends of each of which are journaled rollers 80. The disposition of the four spaced rollers 80 provides a stable support the remainder of the mold assemblies 70. The rollers 80 are adapted to be received by and freely roll within the trackways thereby enabling the mold assemblies 70 and more particularly their carriages 72 to roll therealong.

To maintain the mold assemblies 70 in mutual alignment and to assure that their carriages 72 properly roll within the trackways, a guide 82 is positioned upon the upper and lower ties 24 and 26 between the track supports 34. The guide has a pair of spaced walls 84 which define a guideway 86. In a like manner the front and rear members 54 and 56 support guides and their guideways (not shown). Disposed transverse to the carriage body 74 for reception by and rolling action within the guideway 86 is a guide roller 88.

From the above and viewing the drawings it can be seen that the mold assemblies 70 are able to roll about the corrugator trackway in that the carriage rollers 80 are received into and roll along the endless trackway. The aforementioned rolling of the mold assemblies 70 is guided by the rolling of their guide rollers 88 within the guideway 86.

Secured between the eyelets 76 of each mold assembly 70 is a pivot shaft 94 which pivotally mounts a right and a left mount 96 and 98. The right and left mounts 96 and 98 consist of a pair of pivot arms 100 which are pivotally mounted to the pivot shaft 94 and to a mounting plate 102. Affixed to the outward edges of the mounting plates 102 are L-shaped brackets 104. Opposing the brackets 104, each mounting plate has a retainer 106 the outwardly facing edge of which forms, in cooperation with the mounting plate 102, and angular groove 108.

Figure 8:
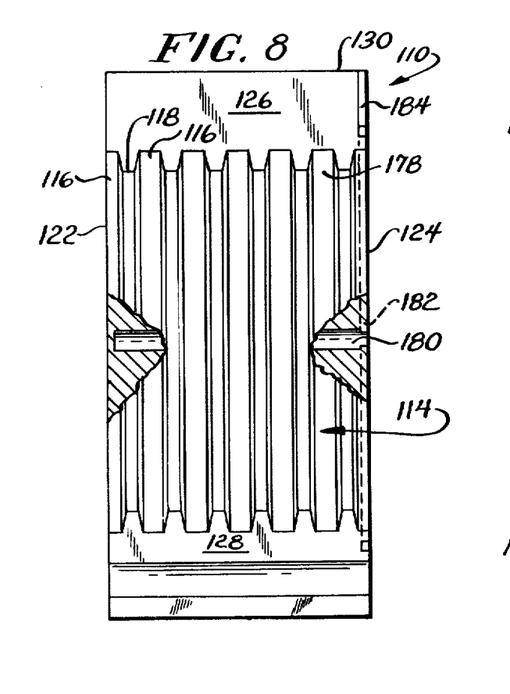
FIG. 8 is a side view of a mold block of the present invention with portions thereof removed for clarity.
Figure 9:
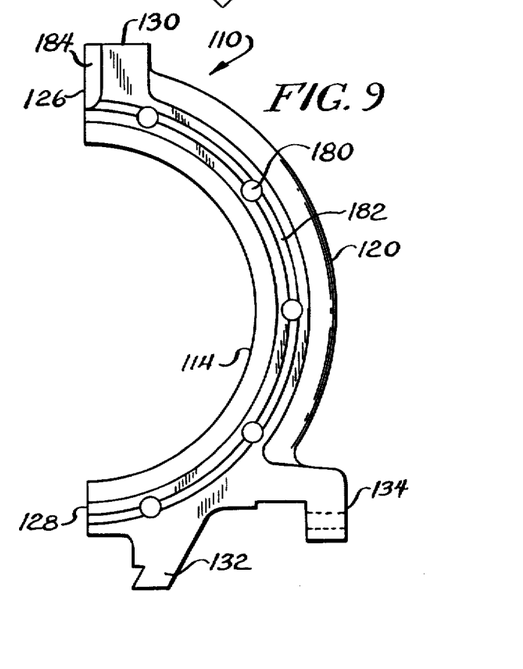
FIG. 9 is a rear end view of the mold block of FIG. 8.

Removably mounted to the plates 102 of each of the right and left mounts 96 and 98 are, respectively, right and left mold blocks 110 and 112. As seen in the drawings, particularly FIGS. 4, 5, 8 and 9 the right block 110 is semi-cylindrical having a corrugated inner wall 114 formed by alternating grooves 116 and lands 118. Opposite the inner wall 114, the right mold block 110 has a finned outer wall 120. Extending between the inner and outer walls 114 and 120 are flat forward and rear end faces 122 and 124, respectively, which as shown in FIG. 8 intersect the inner wall 114 medially of a groove 116 thereon. Orthogonal to the forward and rear end faces 122 and 124 and extending therebetween are upper and lower edges 126 and 128. Additionally, extending orthogonally between the forward and rear end faces 122 and 124 and formed along the outer wall 120 is a top face 130 which, for reasons hereinafter evident, is planar and parallel to the forward trackway 46 when the mold blocks are closed as shown in FIG. 4.

To removably mount the right mold block 110 to the mounting plate 102, the right mold block 110 has extending outwardly from the outer wall 120 thereof a wedge member 132 and a mounting arm 134. The wedge member 132 is disposed along the bottom of the right mold block 110 and is adapted to be received and held by the angular groove 108 as best shown in FIG. 4. The arm 134, acting in cooperation with the wedge member 132, mates with the bracket 104 and is secured thereto as by bolts. Accordingly it is to be understood that by disposing the wedge member 132 within the angular groove 108 and securing the arm 134 to the brackets 104 removably affixes the right mold block 110 to the plate 102 of the right mount 96.

The left mold block 112 and its plate 102 are a mirror image of the right mold block 110 and plate 102 and the means for securing the left mold block 112 to its respective left mount 98 is the same as the method described above. Viewing FIG. 4 it is seen that when the mold blocks are in the closed position the upper and lower edges 126 and 128 thereof mate to form a corrugated molding tunnel 136.

Figure 7:
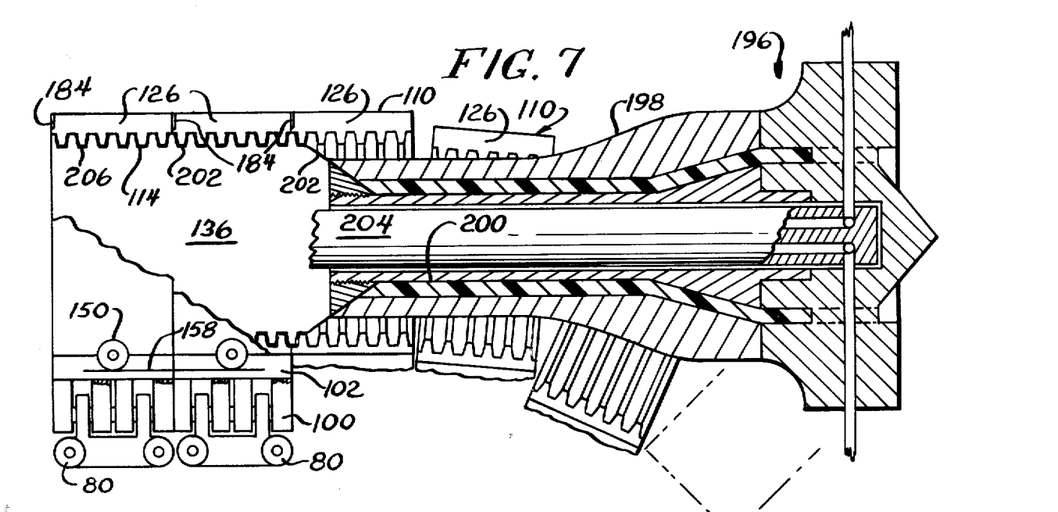
FIG. 7 is a view of an embodiment of the present invention illustrating the extrusion of plastic into the tile corrugator.

To provide a means to drive the mold assemblies 70 and more particularly their carriages 72 about the trackways a pair of spaced sprockets 138 are provided between the front members as shown in FIGS. 1 and 2. The sprockets 138 include a web 140 having secured thereto and radially outward extending therefrom a plurality of tongues 142. The tongues 142 of each sprocket 138 are adapted sequentially engage the axles 79 of the mold assemblies 70 as they leave the return trackways 52, drive the mold assemblies 70 upward along the front trackways 58 to and disengage them at the forward trackways 46. Due to the number of mold assemblies 70 within the trackway and the rolling friction therebetween, the mold assemblies 70 and more particularly their respective mold blocks are, along the forward track, in abutting relationship as best shown in FIGS. 1 and 7. This relationship is maintained as the continuous supply of mold assemblies 70 delivered to the forward trackway 46 by the sprockets 138 pushes the mold assemblies therealong as substantially shown in FIG. 1.

To drive the sprockets 138 shown in FIG. 1 a sprocket motor 144 is provided. The sprocket motor 144 drives a chain 146 which, in turn, drives the sprockets 138. Accordingly, operating the sprocket motor 144 which preferably is of the variable speed type, rotates the sprockets 138 which, in turn, drives the mold assemblies 70 for circulation about the endless trackway.

For proper operation of the corrugator 10, the mold blocks of the mold assemblies 70 must pivotally close as they enter the forward trackway 46 to form the molding tunnel 136. Accordingly, and as best shown in FIGS. 4 and 5 each mold assembly 70 has a pair of opposing follower axles 148 extending outwardly from the brackets 104. Journaled upon the ends of the follower axles 148 are roller bearings which define followers 150.

Cooperating with the followers 150 to open and close the mold blocks are a pair of cam surfaces 152 disposed above and along the forward track assembly 30. Each cam surface 152 consists of a forward and a rear sloping surface 154 and 156 and a plateau 158 therebetween, the plateau 158 being parallel to the forward trackway 46 and defining thereby the molding section of the corrugator 10. As the mold assemblies 70, driven by the sprockets 138, approach and initiate rolling along the forward trackway 46, the followers 150 engage and roll along the cam surfaces 152 and more particularly the relatively short forward surfaces 154 thereof. In so doing the interaction of the followers 150 and the forward surfaces 154 induces a moment upon the pivoting right and left mold blocks 110 and 112 causing them to simultaneously close. Upon reaching the plateaus 158, the closing action of the mold blocks is complete and, as shown in FIG. 4, the upper and lower edges 126 and 128 thereof have mated to form, with the preceedingly closed mold assemblies 70, a continuous molding tunnel 136 extending the length of the molding section (see FIG. 1). It is in this section of the corrugator, as described below, where thermoplastic continuously is received and molded into a corrugated tile.

Leaving the molding section, the followers 150 engage and roll along the rear surfaces 156 thereby causing the right and left mold blocks 110 and 112 of each mold assembly 70 to pivot and radially open from the tile. The following of the rear surfaces 156 and the concomitant opening of the mold blocks is due to the off-center pivotal mounting of the mold blocks to the pivot shaft 94. Leaving the cam surface 152 and more particularly the rear surfaces 156 thereof, the mold blocks are in the open position shown in FIGS. 2 and 5.

To maintain the mold blocks in the open position along the return trackway 52 for cooling thereof, as described in detail below, the braces 20 support opposing projections 160 which, in turn, angularly mount opposing shelves 162. As best seen in FIG. 5 the followers 150 roll along the shelves 162 thereby maintaining the mold blocks in the open position throughout the extent of the return trackway 52. To accommodate the foregoing without interference, the return rails 50 are appropriately beveled.

The front and rear members 54 and 56 likewise support shelves (not shown) to assure that the mold assemblies 70 roll therealong in the open position.

As stated above the thermoplastic is received by the mold tunnel 136 for the formation of corrugated tile therefrom. The thermoplastic, as received, is at some elevated temperature, depending upon the plastic used in order to make the thermoplastic pliable and thereby susceptible to molding. Therefore, means are required to cool the thermoplastic particularly along the molding section of the corrugator 10. Accordingly, cooling air is supplied to the corrugator 10 from a blower (not shown) through a supply duct 164. Communicated with the duct 164 are a pair of side plenums 166 and a bottom plenum 168. As best seen in FIGS. 3 and 4 each of the side plenums 166 communicates with and supplies cooling air through exhaust plenums 170 extending along the molding section and which are directed inwardly toward the mold blocks. Cooperating with the exhaust plenums 170 are a pair of arcuate shields 172 spaced from and directing the flow of cooling air around the mold blocks. The shields 172 are spaced from one another near the top of the mold assemblies 70 (as seen in FIGS. 3 and 4) to define an exhaust 174 for cooling air. It follows that cooling air supplied by the side plenums 166 is, through the exhaust plenums 170 and with the aid of the shields 172, directed against and around the finned outer walls 120 of the mold blocks for cooling thereof. The cooling air leaving the exhaust 174 is preferably collected by an air exhaust hood (not shown) disposed above the corrugator 10. By the foregoing, the cooling of the mold blocks and more particularly the thermoplastic therein is accommodated.

To augment the cooling along the molding section of the corrugator 10 described above, the bottom plenum 168 provides for cooling of the mold blocks along the return trackway 48. In this manner any residual heat remaining in the mold blocks subsequent to their use in the molding of the tile can be dissipated. Accordingly the bottom plenum 168 has one end in communication with the supply duct 164, the other end of the bottom plenum 168 disposed near the front members 54 being open. As seen in FIG. 5 the bottom plenum 168 communicates with and supplies cooling air to the mold assemblies 70 through a plurality of slots 169 directed toward the mold assemblies 70. To augment the cooling, upstanding walls, spaced from the right and left mold blocks 110 and 112, have a plurality of protruding diffusers 176 to assure the turbidity of the cooling air as it flows within the bottom plenum 168. A plurality of openings are disposed along the bottom plenum 168 to provide exhaust for cooling air. However, the space between the walls paralleling the mold blocks is the primary exhaust and thereby ultimately exhausts via exhaust 174. From the foregoing it can be seen that the mold blocks are cooled along the return trackway 52 by the blowing of cooling air through the bottom plenum 168.

The aforementioned cooling of the molds is normally accomplished by the blowing of ambient air by the blower in the above described fashion. To increase the cooling effects, and thereby the speed at which the corrugator 10 may operate, chilled air may be used in place of ambient. Additionally or alternatively, water spray for evaporative cooling may be used along the bottom planum 168, however evaporation must be complete prior to the entry of the mold section by the mold assemblies 70.

In that the continuous reception by the corrugator 10 of the heated thermoplastic often results in the mold blocks achieving an elevated equilibrium temperature, means are required to accommodate the concomitant thermal expansion of particularly the mold blocks. The aforementioned expansion, is left uncontrolled, may result in increased wear between the mold blocks of adjoining mold assemblies 70 as they pivotally open and close. Additionally, the free rolling action of the mold assemblies 70 may be impaired. Accordingly, the rear members 56 are interconnected to the frame via a pair of adjustable assemblies 177. The assemblies 177, which may be manually adjusted or spring loaded permit the rear members 56 to move right and left as shown in FIG. 1 to lengthen or shorten the endless trackway and more particularly the forward and return trackways 46 and 52 thereof. To maintain the uninterrupted trackway about the corrugator 10 the rear trackways 60 and rear surfaces 156 must be long enough to accommodate the adjustment of the rear members 56.

In order to assure that the thermoplastic properly fills the molding tunnel 136, means are required to apply a vacuum therealong particularly at the grooves 116. To accommodate the foregoing each of the right and left mold blocks 110 and 112 has, as shown in FIGS. 4, 5, 8 and 9, a plurality of slits 178 disposed in the grooves 116 of the corrugated inner walls 114 thereof. Each of these slits communicates with one of a plurality of bores 180. The bores 180 extend from the rear end face 124 of each mold block and have a terminus short of the forward end face 122. The bores 180 are in communication with semicircular grooves fashioned in the rear end faces 124 which, when the mold blocks are closed define a continuous circular vacuum header 182. The vacuum header 182, in turn, is in communication with the top faces 130 of the mold blocks via a port 184 cooperatively disposed in the rear end faces 124 of each mold block. Accordingly, when the mold blocks are closed, the slits 178, through the bores 180 and vacuum header 182, are in communication with the port 184.

To induce a vacuum within the port 184, and thereby the slits 178, a plurality of vacuum manifolds 186 are provided as shown in FIGS. 1 and 4. Each manifold 186 has a rectangular member supported above the mold blocks by sets of wheels 187 journalled at either end of the rectangular member. The wheels 187 bear against and roll along the top faces 130 of the mold blocks to maintain the rectangular member, and, more particularly, a planar sealing face 188 on the lower side thereof, in a close, parallel relationship with the top faces 130. In this manner clearances on the order of 0.002 inches (0.05 mm) may be maintained between the sealing faces 188 of the mainfolds 186 and the top faces 130 of the mold blocks. Furthermore, the use of the wheels 187 reduces the friction exerted against the mold assemblies 70 as they travel along the molding section. Accordingly it is seen that the foregoing provides a seal between the manifolds 186 and the stop faces 130 of the moving mold blocks. It is to be noted that a single manifold extending the length of the molding section may be used. However, the employment of separate shorter manifolds 186, as illustrated, the combined lengths of which extends along the molding section, is preferred so that possible undulations in the forward trackway 30 can be followed by the manifolds 186 thereby maintaining the close clearances between the sealing faces 188 and top faces 130 noted above.

To hold the manifolds 186 at their proper positions along the molding section, guide blocks 189 are suspended from the upper cross-members 22. The guide blocks 189 have a manifold slot 191 to receive and guide the up and down movement of the manifolds 186 as they follow the mold assemblies 70 and more particularly the top faces 130. Each guide block 189 is also provided with a pin 193 which extends downwardly to register with a hole in the adjacent manifold 186 to restrain the manifold 186 against horizontal movement along the molding section.

From the foregoing the operation of the vacuum means is evident. When the mold blocks close the upper and lower edges 126 and 128 thereof mate creating the continuous vacuum header 182 in the rear end faces 124 of the mold blocks. The planar forward end faces 122 of a succeeding mold assembly 70, as shown in FIG. 7, abuttingly engage the rear end faces 124 sealing the header 182 from the environment along the molding section of the corrugator 10. In a like fashion all the headers 182 of the mold assemblies 70 within the molding section are sealed. As the ports 184 communicate with the mainfolds 186 a vacuum is induced thereby in the headers 182, bores 180 and the slits 178. In this manner, as the thermoplastic is dispensed in the molding tunnel 136, the corrugations thereof become entirely filled since any air tapped therebetween is evacuated. Additionally the vacuum tends to draw the plastic into the grooves 116.

To enable the corrugator 10 to be movable, the corrugator 10 has four wheels 190 extending outwardly from the side beams 14 to support the corrugator 10 upon a pair of rails 192. One of the forward wheels 190 is chain driven by a drive motor 194 as shown in FIG. 2. From a motor control center (not shown) the drive motor 194 may be operated thereby causing the corrugator 10 to move along the rails 192 toward a stationary extruder 196 in preparation to the molding of tile or any therefrom for maintenance.

From the foregoing the operation of the corrugator 10 can be set forth. Moving the corrugator 10 toward the extruder 196 causes the extruder head 198, shown in FIG. 7, to be received into the molding tunnel 136. Typically the extruder head 198 has an annular passageway 200 through which heated, thermoplastic 202 is dispensed in a cylindrical fashion. An axial member 204 protrudes axially into the molding tunnel 136 and typically has a radially outwardly extending annular seals (not shown). Through the axial member 204 compressed air or the like may be admitted to, between the extruder head 198 and the annular seals, expand the thermoplastic against the corrugated inner wall 114 of the molding tunnel 136. A typical extruder head 198 is described in U.S. Pat. No. 3,981,663 issued Sept. 21, 1976 to Lupke.

Subsequent to the positoning of the corrugator 10, the sprocket motor 114, blower and vacuum pump are started via appropriate controls on the motor control center. Thereafter, the thermoplastic 202 is dispensed from the extruder head 198 into the molding tunnel 136 in the fashion illustrated in FIG. 7. Due to the above described expansion of the thermoplastic and vacuum induced through the slits 178, the thermoplastic 202 mates with the corrugated molding tunnel 136. In that the mold assemblies 70 are continuously rolling along the molding section, the dispensed thermoplastic 202 is continuously formed into a corrugated tile 206.

At the end of the molding section the mold blocks pivotally open radially from the tile 206 which has been cooled by air from the blower. To augment the separation of the mold blocks from the tile 206, the vacuum manifold 186 near the end of the molding section may be supplied with a compressed gas. In this manner, the compressed gas flows through the slits 178 to blow the tile 206 away from the mold blocks.

The mold assemblies 70 not dedicated to the formation of the molding tunnel 136 are continuously returned along the return trackway 32 where they are cooled.

If a different size tile 206 is desired, the right and left mold blocks 110 and 112 are removed from each mold assembly 70. A pair of mold blocks defining a different size tile are thereafter secured to the carriages 72. It is to be noted that the interchanged mold blocks must have top faces 130 which can slide along the vacuum manifolds 186 in the manner described above.

While we have shown and described certain embodiments of a tile corrugator it is to be understood it is capable of many modifications. Changes, therefore, in the construction and arrangement may be made without departing from the scope of the device set forth above and as described in the attached claims.

We claim:

1. A corrugator for receiving plastic from an extruder to form corrugated tile therewith, said corrugator comprising:
    a frame having an endless trackway thereabout, a portion of said trackway defining a molding section;
    a plurality of disconnected mold assemblies, each rollably disposed on said trackway, each of said mold assemblies pivotally opening and closing a pair of mold blocks which when closed define a segment of a corrugated molding tunnel;
    rolling followers disposed on each of said mold assemblies, said followers rollably following cam surfaces to effectuate opening and closing of said mold blocks;
    means for driving said mold assemblies to rollably circulate about said trackway, said mold blocks of adjacent mold assemblies being arranged contiguously along said molding section to cooperate to define a corrugated molding tunnel to receive, move with, and form a corrugated tile.

2. The corrugator of claim 1 wherein said driving means is disposed to push the mold assemblies along the molding section with the mold blocks of adjacent mold assemblies abutting to cooperate to define said molding tunnel.

3. The corrugator of claim 1 wherein said mold assemblies include a pivotable carriage rollingly disposed in said trackway, said carriage supporting the mold blocks.

4. The corrugator of claim 1 wherein said driving means includes a motor driven sprocket disposed on said frame, said sprocket engaging and driving said mold assemblies about said trackway.

5. The corrugator of claim 1, further comprising means for inducing a vacuum in said tunnel when said mold blocks are closed, said vacuum means being in communication with an opening in said mold blocks and around said tunnel, said opening being in communication with a plurality of radially spaced bores, each of said bores being in communication with said tunnel through a plurality of slits in said mold blocks.

6. The corrugator of claim 5, wherein said opening is defined by a groove in one end face of one mold block pair and the abutting end face of an adjacent mold block pair.

7. The corrugator of claim 5, wherein each mold block pair includes ten radially spaced bores.

8. A corrugator for molding corrugated plastic tile from plastic received from an extruder, said corrugator comprising:
    a frame having a forward trackway, a return trackway and having front and rear trackways cooperating with the forward and return trackways to define a continuous trackway about said frame;
    a plurality of separate carriages disposed along said trackways for continuous rolling action therealong, each of said carriages being pivotable about an axis generally aligned with said trackway;
    a pair of mold blocks mounted to each carriage, said mold blocks opening and closing by pivoting of said carriage to define a corrugated tile mold when closed;
    a driven sprocket disposed adjacent to said front trackway for engaging and driving said carriages to continuously roll about said trackway, said mold blocks of adjacent carriages traveling in abutting relationship along said forward trackway;
    rolling followers associated with each of said carriages;
    a first cam which engages said followers to pivot said carriages to close said mold blocks as they encounter the forward trackway, said sequentially closed mold blocks cooperating to define a plastic receiving and molding corrugating tunnel which is parallel to the forward track; and a second cam which engages said followers to pivot said carriages to radially open said mold blocks from the molded tile as they leave the forward trackway, said mold blocks thereafter rolling along said rear and return trackways for return to said sprocket.

9. The corrugator of claim 8 further including a plenum to supply cooling air along said return trackway for cooling of said mold blocks.

10. The corrugator of claim 8 wherein each of said mold blocks has outer fins disposed in the path of said cooling air for cooling of said mold blocks and the tile therein.

11. The corrugator of claim 8, further comprising means for inducing a vacuum in said tunnel when said mold blocks are closed, said vacuum means being in communication with an annular opening in said mold blocks around said tunnel, said opening being in communication with a plurality of circumferentially spaced bores, each of said bores being in communication with said tunnel through a plurality of axially spaced slits in said mold blocks to provide a substantially uniform vacuum around the circumference of the tunnel.

12. The corrugator of claim 11, wherein said opening is defined by a groove in one end face of one mold block pair and the abutting end face of an adjacent mold block pair.

13. The corrugator of claim 11, wherein each mold block pair includes at least three uniformly spaced bores.

14. A corrugator for receiving plastic from an extruder and molding the same into a corrugated plastic tile, said corrugator comprising:
   a frame having thereon a forward trackway, a return trackway and having front and rear trackways, the trackways cooperating to define an endless trackway about said frame;
   a plurality of individual mold assemblies each of which has a pivotable carriage with rollers disposed on said endless trackway for rolling action therealong and a pair of mold blocks mounted to said carriage for opening and closing transversely with respect to said endless trackway, said mold blocks when closed forming a corrugated tile mold extending therethrough;
   a driven sprocket, said sprocket including a plurality of tongues to sequentially engage said mold assemblies and continuously drive them about said frame, said carriages of adjacent mold assemblies being pushed in abutting relationship to arrange said mold blocks of adjacent mold assemblies contiguous to one another along said forward trackway;
   a cam surface along said forward trackway to pivot said carriages and close said mold blocks therealong to form a molding section defined by a corrugated tunnel to receive, move with and mold extruded plastic, said cam surface pivoting said carriages to open said mold blocks radially away from said molded tile at the end of the molding section;
   an annular opening in said mold blocks and around the tunnel, said opening being in communication with radially spaced longitudinal bores in said mold blocks which are in turn in communication with said tunnel through a plurality of slits; and
   a vacuum manifold spaced closely from said mold blocks along said forward trackway, said manifold communicating with said annular opening through a port in said mold blocks which registers with said manifold along said molding section.

15. The corrugator of claim 14 wherein said manifold is maintained closely spaced from said mold blocks by a plurality of rolling wheels interposed between said manifold and said mold blocks.

16. The corrugator of claim 13 wherein said annular opening is a header including a groove on one end face of the mold blocks which mates with a flat second end face on adjoining mold blocks thereby cooperating to seal said vacuum header.

17. In a device for molding corrugated plastic tile of the type having an endless trackway with mold blocks continuously recirculating about said trackway to define a segment of a molding tunnel having a corrugated wall along an axial portion of said trackway for receiving plastic to mold a tile, the improvement comprising:
   mold block pairs have a plurality of axially spaced slits communicating with said tunnel, said slits intersected by a plurality of circumferentially spaced bores extending into said mold blocks from one end face thereof, said one end face having a groove intersecting said bores and extending to the periphery of said one end face, said groove defining a closed passageway when said one end face of said pair of mold blocks is contiguous to another end face of an adjacent mold block pair; and
   means for inducing a vacuum in said passageway along said trackway portion, the passageway vacuum withdrawing air from said tunnel through all of said slits and bores so that said plastic conforms to the corrugated wall of said tunnel.

18. The device of claim 17 wherein said corrugated wall is defined by alternating grooves and lands and said slits are disposed in said grooves.

19. The device of claim 17 wherein said mold block pairs have arcuate cuts defining said slits.

20. The corrugator of claim 17, wherein said slits and bores are circumferentially located to provide a substantially uniform vacuum about the circumference of the tunnel.

21. The corrugator of claim 17, wherein said slits are substantially uniformly spaced about the tunnel circumference.

22. The corrugator of claim 17, wherein each mold block pair includes at least three uniformly spaced bores.

23. The device of claim 17 wherein said one and another pairs of mold blocks abut along said portion, said one end face mating with said another end face to cover said groove and define said closed passageway.

24. The device of claim 23 wherein said vacuum means is a vacuum header disposed to communicate with said passageway along said trackway portion.

25. In a device for molding corrugated plastic tile of the type having an endless trackway, a pair of mold blocks continuously recirculating about said trackway and cooperating along a portion of said trackway to define a segment of a tunnel having a corrugated wall for receiving plastic to mold a tile, comprising:
   a pair of block bodies which together form said tunnel segment and having a plurality of axially spaced slits about the circumference of the tunnel segment and communicating with said tunnel, said slits intersected by a plurality of circumferentially spaced bores extending in the direction of said tunnel, said bodies also having an annular opening around said tunnel and communicating with said bores and a vacuum port opening said annular opening to the outside of said blocks so that a vacuum through said port induces a substantially uniform vacuum around said tunnel through all of the slits.

26. The mold blocks of claim 25, wherein said pair of block bodies include at least three uniformly spaced bores.

* * * * *